United States Patent
Gangstoe et al.

(10) Patent No.: US 7,629,769 B2
(45) Date of Patent: Dec. 8, 2009

(54) POWER SURGE FILTERING IN OVER-CURRENT AND SHORT CIRCUIT PROTECTION

(75) Inventors: Gunnar Gangstoe, Trondheim (NO); Hideyuki Sato, Chiba (JP); Arne Aas, Trondheim (NO); Terje Saether, Trondheim (NO)

(73) Assignees: Atmel Corporation, San Jose, CA (US); Sony Corporation, Tokyo (JP)

( * ) Notice: Subject to any disclaimer, the term of this patent is extended or adjusted under 35 U.S.C. 154(b) by 383 days.

(21) Appl. No.: 11/372,975

(22) Filed: Mar. 10, 2006

(65) Prior Publication Data
US 2007/0210758 A1   Sep. 13, 2007

(51) Int. Cl.
*H02J 7/04* (2006.01)
(52) U.S. Cl. .................. 320/134; 320/112; 320/114; 320/135
(58) Field of Classification Search .......... 320/134, 320/112, 114, 135, 136; 323/222, 224, 226, 323/273, 271, 282, 269, 284
See application file for complete search history.

(56) References Cited

U.S. PATENT DOCUMENTS

| | | | |
|---|---|---|---|
| 3,665,253 A | 5/1972 | Stefani | |
| 4,636,705 A * | 1/1987 | Bowman | 322/28 |
| 5,530,336 A | 6/1996 | Eguchi | |
| 5,600,233 A | 2/1997 | Warren | |
| 5,963,019 A | 10/1999 | Cheon et al. | |
| 6,316,915 B1 | 11/2001 | Fujiwara | |
| 6,992,463 B2 * | 1/2006 | Yoshio | 320/134 |
| 7,145,313 B2 | 12/2006 | Geren | |
| 2002/0163821 A1 * | 11/2002 | Odell | 363/56.11 |
| 2003/0193318 A1 * | 10/2003 | Ozawa et al. | 320/132 |
| 2004/0093531 A1 | 5/2004 | Espinor | |
| 2005/0110468 A1 | 5/2005 | Turner et al. | |
| 2006/0170398 A1 * | 8/2006 | Gangsto et al. | 320/132 |
| 2007/0075676 A1 * | 4/2007 | Novak | 320/101 |

OTHER PUBLICATIONS

PCT International Search Report in corresponding PCT application #PCT/US07/63619, dated Feb. 15, 2008, 2 pages.

* cited by examiner

*Primary Examiner*—Matthew V Nguyen
*Assistant Examiner*—Nguyen Tran
(74) *Attorney, Agent, or Firm*—Fish & Richardson P.C.

(57) ABSTRACT

A battery pack can include one or more battery cells, current blocking transistors and a battery management system. The disclosed implementations handle over-currents drawn from the battery cells that cause unstable operation of the battery management system. The over-currents are handled without causing an undesired drop in voltage output from the battery cells. The disclosed implementations can handle over-currents even if the over-currents cause the battery management system supply voltage to drop below a minimum operating voltage level for a certain period of time. The disclosed implementations use current blocking transistors that can be configured to block current flow and ensure safe operation of the battery cells in cases where the current drawn from the battery cells would be sufficiently high for a sufficiently long period of time to cause damage to the battery cells.

18 Claims, 8 Drawing Sheets

POWER SURGE FILTERING IN OVER-CURRENT AND SHORT CIRCUIT PROTECTION

TECHNICAL FIELD

The disclosed implementations relate generally to electrical circuits.

BACKGROUND

Many modern portable devices (e.g., laptop computers, mobile phones, digital cameras, video cameras, media players, personal digital assistants (PDAs), game console, etc.) include battery packs. Battery packs typically include one or more battery cells coupled to two or more Integrated Circuit (IC) chips (e.g., a microcontroller, analog front-end, etc.) for providing battery cell management and protection and for making charge left measurements.

Many battery packs typically use a Lithium-ion (Li-ion) battery cell, which is essentially a volatile chemical reaction packaged inside a cylinder or prismatic. Potential energy is stored in each cell, and if the battery cell is exposed to conditions outside of its specification the cell could overheat, catch fire or explode. Battery packs typically include fail-safe circuitry for detecting unsafe conditions (e.g., charge or discharge over-currents, short circuits, etc.), and for taking corrective action to prevent damage to the battery cell and/or device, and to protect consumers from exploding batteries and other dangerous events.

When a battery pack is connected to a device, or when the device enables a feature with high power consumption (e.g., a motor), a high current can be drawn from the battery pack for a period of time. These events are part of normal battery operation, and should be managed so that the battery pack and the device are able to maintain stable operation. Ideally, a battery pack should function to protect battery cells from high currents maintained for a long period of time (i.e., longer than normal high current events), since such currents are potentially dangerous to the user and damaging to the battery cells. Such abnormal high current events can be prevented by stopping the high current flow. Stopping the current flow, however, can cause the output voltage of the battery pack to drop to zero or close to zero, resulting in unstable operation of the battery system. It is important, therefore, to distinguish high currents resulting from normal operation from high currents that are potentially dangerous and/or damaging.

Conventional battery packs do not distinguish between high currents resulting from normal operation and high currents that are potentially dangerous and/or damaging. High currents are often treated as potentially dangerous and/or damaging, even if they result from normal operation.

SUMMARY

The deficiencies of conventional battery protection solutions are overcome by the disclosed implementations related to power surge filtering in over-current and short circuit conditions.

In some implementations, a battery system includes a battery cell, a battery protection circuit coupled to the battery cell, and a processor coupled to the battery protection circuit for determining if a battery protection event has occurred. The battery system also includes a voltage regulator circuit coupled to the battery cell and the processor. The voltage regulator circuit is configurable to provide power to the processor. An energy storage device is coupled to the voltage regulator and configurable to provide the processor with power during the battery protection event. A switch is coupled between the energy storage device and the battery cell, and is configurable to selectably disconnect the energy storage device from the battery cell during the battery protection event.

In some implementations, an integrated circuit for a battery system includes a battery protection circuit adapted to be coupled to a battery cell. A processor is coupled to the battery protection circuit for determining if a battery protection event has occurred. A voltage regulator circuit is coupled to the processor and configurable to provide power to the processor. An energy storage device is coupled to the voltage regulator and configurable to provide the processor with power during the battery protection event. A switch is coupled between the energy storage device and the battery cell and configurable to disconnect the energy storage device from the battery cell during the battery protection event.

In some implementations, a battery protection method includes: providing power from a voltage regulator to a processor in a battery system, where the voltage regulator is coupled to a battery cell and regulates the voltage received from the battery cell to provide the power to the battery system; receiving signals indicative of a battery protection event; during the battery protection event, selectively disconnecting the voltage regulator from the battery cell; and providing power to the processor from an energy storage device coupled to the battery cell.

In some implementations, an integrated circuit for a battery system includes a battery protection circuit adapted to be coupled to a battery cell. A processor is coupled to the battery protection circuit and configurable to receive signals from the battery protection circuit for determining if a battery protection event has occurred. A voltage regulator circuit is coupled to the processor and configurable to provide power to the processor during times other than battery protection events. An energy storage device is coupled to the voltage regulator, and configurable to provide the processor with power during the battery protection event.

In some implementations, a battery protection method comprises: receiving signals indicative of a battery protection event; providing an interrupt signal to the processor; and changing the processor to a low power consumption mode in response to the interrupt signal.

Other implementations are disclosed which are directed to systems, methods and devices having one or more of the various features described below.

DETAILED DESCRIPTION

Battery System

Figure 1A:
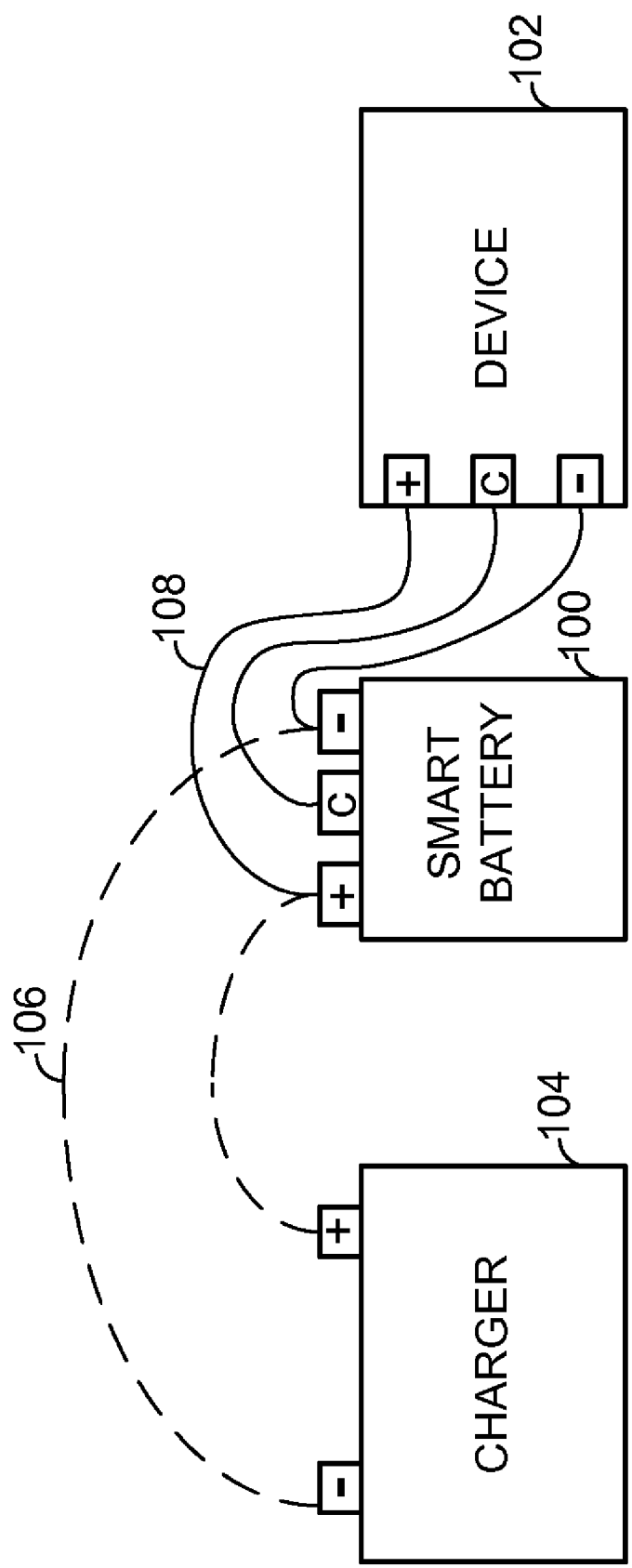
FIG. 1A is a block diagram of an exemplary battery pack.

FIG. 1A is a block diagram of an exemplary battery pack 100 for an application 50. The battery pack 100 can be coupled to a device 102 or a charger 104. When coupled to the charger 104, terminals (i.e., positive and negative and communication terminals) of the battery pack 100 are coupled by a medium 106 to corresponding terminals (i.e., positive and negative and communication terminals) of the charger 104 to allow for the charging of battery cell(s) associated with the battery pack 100. The medium 106 can be wires, leads, pins, or any other means of electrical connection. Charging is discussed in greater detail below.

Similarly, when coupled to a device 102, terminals (i.e., positive and negative and communication terminals) of the battery pack 100 are coupled by a conductive medium 108 to corresponding terminals (i.e., positive and negative and communication terminals) of the device 102 to allow for the operation of the device 102. The medium 108 can be of the form of wires, leads, pins, or other means of electrical connection. In some implementations, the battery pack 100 is optionally coupled to device 102 and charger 104 at a communication port C. Communication ports allow for the transfer of information (e.g., command and control) between the device 102, the charger 104 and the battery pack 100. One example of information that can be exchanged includes the battery charge level (e.g., capacity).

Figure 1B:
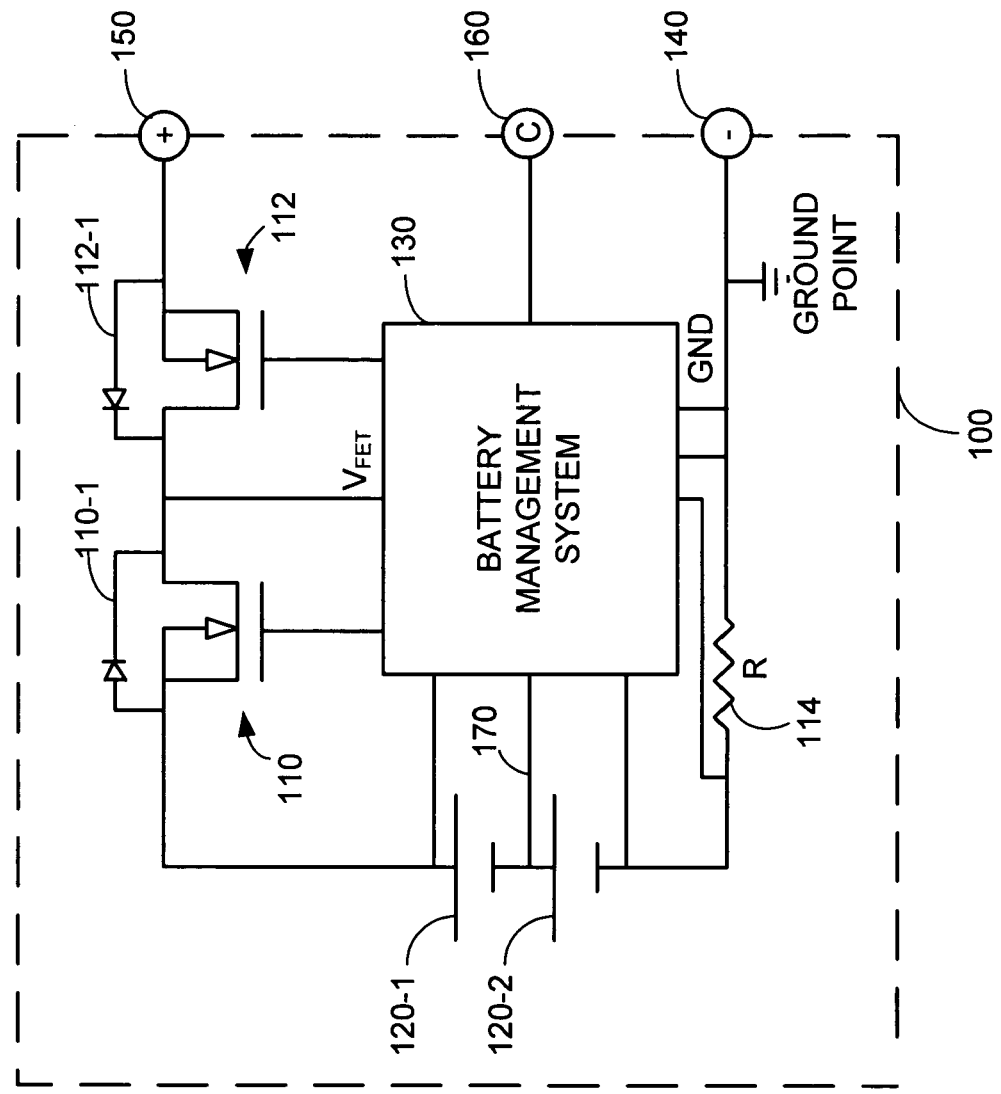
FIG. 1B is a more detailed schematic diagram of the battery pack in FIG. 1A.

FIG. 1B is a more detailed schematic diagram of the battery pack 100. In some implementations, the battery pack 100 includes one or more battery cells 120, discrete transistors 110, 112, a current sense resistor 114 and a battery management system 130. The battery management system 130 can include one or more integrated circuits (i.e., chips or chip sets). The discrete transistors 110, 112, and/or the current sense resistor 114 can be implemented in the same package (e.g., an integrated circuit) and/or in the same silicon.

In some implementations, the discrete transistors 110, 112 are used to disconnect the battery cells 120 from the external battery pack terminals (external battery pack positive terminal 150 and negative terminal 140). In the implementation shown, discrete transistors 110, 112, are shown as Field Effect Transistor (FET) devices. While other transistor technologies can be used, FETs present advantages in terms of process, performance (e.g., on-resistance), cost, size, etc. In the implementation shown, the discrete transistors 110, 112, are also referred to as charge and discharge transistors, respectively. The charge transistor 110 is used to enable safe charging of the battery cells 120. The discharge transistor 112 is used to enable safe discharging of the battery cells 120. The charge and discharge transistors 110,112 are shown coupled in series.

In the implementation shown, the charge and discharge transistors 110, 112 are coupled in a high-side configuration (i.e., the series transistors are coupled to the high side of the battery cells as opposed to the low-side of the battery cells). In the high-side configuration, one terminal of the charge transistor 110 (e.g., the source terminal of a NFET device) is coupled to the positive terminal of the battery cell 120-1. One terminal of discharge transistor 112 (e.g., the source terminal of a NFET device) is coupled to the external battery pack positive terminal 150. Respective second terminals of the charge and discharge transistors 110, 112 are coupled to each other (e.g., forming a drain-to-drain node when using NFET devices). The gate terminals of the charge transistor 110 and discharge transistor 112 are coupled to the battery management system 130 at inputs OC and OD, respectively. Similarly, the node between the transistors 110, 112 is coupled to the battery management system 130 at a chip supply voltage input (also referred to herein as $V_{fet}$). The chip supply voltage input provides power to the battery management system 130.

In the implementation shown, the transistors 110, 112, are used to block the current flow between the battery cells 120 and the device 102 or charger 104 in both directions. If the transistors 110, 112 are FETs, then they will each include a parasitic diode (labeled 110-1 and 112-1, respectively). Thus, having a single FET would not allow for the disabling of current flow in both directions. When two FETs are used in series (either source-to-source, or drain-to-drain), current flow into and out of the battery cells 120 can be enabled and disabled. For example, when two transistors are used, the transistors can be selectively controlled (e.g., by applying control voltages to their gate terminals) to allow current flow in only a single direction at a given time (e.g., charge is allowed, but discharge is not allowed until sufficient charge has been placed into the battery cells).

Battery cells 120 are rechargeable batteries and can be of the form of lithium ion (Li-ion) or lithium polymer (Li-polymer). Other battery technology types are possible. Where multiple battery cells are provided, the battery cells 120 can be coupled in series. In the multiple cell implementation shown, a top-most positive terminal of battery cell 120-1 is coupled to the battery management system 130 (e.g., to allow for the detection of the battery voltage level) and to one of the discrete transistors (i.e., the charge transistor 110). The negative terminal of the bottom most battery cell 120-2 in the series is coupled to the battery management system 130 (e.g., to allow for the detection of the battery voltage level) and to one terminal of the current sense resistor 114. The second terminal of the current sense resistor 114 is coupled to local ground (battery local ground), the battery management system 130 (to allow for the measurement of current flow through the current sense resistor 114) and to the external negative terminal 140 of the battery pack 100. The negative terminal of the battery cell 120-1 and the positive terminal of the battery cell 120-2 are coupled together. In one implementation, the center point 170 between battery cells 120-1, 120-2, is coupled to the battery management system 130.

Although FIG. 1B shows two NFET devices connected drain-to-drain, other devices and configurations are possible. For example, PFET devices can be used with suitable configurations, such as source-to-source.

Battery Management System

Figure 2:
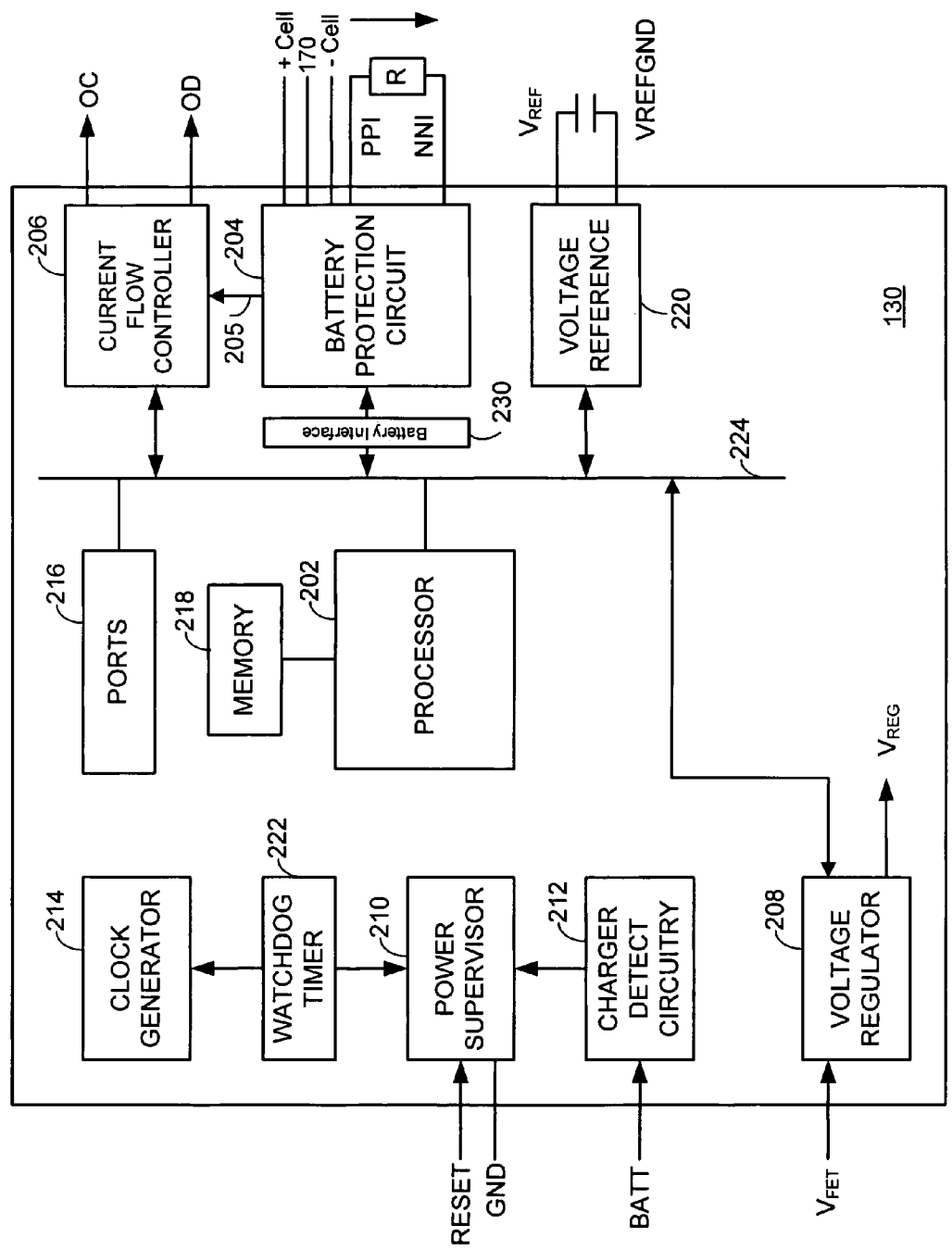
FIG. 2 is a block diagram of an exemplary battery chip.

FIG. 2 is a block diagram of an exemplary battery management system 130 used in the battery pack 100. The battery management system 130 generally includes a processor 202 (e.g., a low-power, CMOS 8-bit microcontroller based on RISC architecture), a battery protection circuit 204, a battery protection circuit/processor interface 230, a current flow controller 206, a power supervisor 210, a charge detector 212, a clock generator 214, ports 216, memory 218, a voltage reference 220 and a watchdog timer 222. The processor 202, ports 216, battery protection circuit 204 and voltage reference 220 are each coupled to a data bus 224.

A practical implementation of the battery management system 130 can include other components and subsystems, which have been removed from FIG. 2 for clarity purposes. For example, the battery management system 130 can include circuitry for battery monitoring (e.g., analog-to-digital converters), cell balancing circuitry (e.g., cell balancing FETs) for balancing cell voltages, noise suppression circuitry, a wake-up timer, etc.

Memory 218 can be programmed with instructions that can be executed by the processor 202 to perform various tasks, such as cell balancing, battery protection, and current measurements for determining charge remaining.

In some implementations, the current flow controller 206 has several outputs (e.g., OC, OD) which are coupled to external transistor devices (e.g., transistors 110, 112) that can be configured by the current flow controller 206 to control the current flow between the battery cells and a device or charger. The current flow controller 206 includes various circuits and logic (e.g., operational amplifiers, control and status registers, transistors, capacitors, diodes, inverters, gates, etc.) for generating voltages at the outputs OC and OD.

In some implementations, the OC output is a high voltage output that is coupled to the gate of a charge FET 110 to enable or disable the charge FET 110 to control current flow during a charging event. The OD output is a high voltage output that is coupled to the gate of a discharge FET 112 to completely or partially enable or disable the discharge FET 112 to control current flow during a discharging event. FIG. 1B shows an exemplary configuration of FET devices for controlling current flow in response to control voltages from the battery management system 130.

Battery Protection Circuit

The current flow controller 206 is coupled to the battery protection circuit 204 (e.g., through interface 205). The battery protection circuit 204 includes circuitry (e.g., a differential amplifier) for monitoring and detecting the battery cell voltage and charge/discharge currents associated with battery protection events, and to initiate actions (e.g., disabling charge and/or discharge FETs) to protect the battery pack 100 from being damaged. Examples of battery protection events include but are not limited to: deep under-voltage during discharging, short circuit during discharging and over-current during charging and discharging.

In some implementations, a current sense resistor (R) can be coupled across the PPI and NNI inputs of the battery protection circuit 204, where PPI is an unfiltered positive input from the current sense resistor 114 and the NNI is an unfiltered negative input from the current sense resistor 114. The current sense resistor 114 can be coupled to the battery management system 130, as described with respect to FIG. 1B.

The battery protection circuit/processor interface 230 provides a programmable interface between the battery protection circuit 204 and the processor 202.

Detecting High Current Conditions

High currents through the current sense resistor 114 will cause a voltage drop across the current sense resistor 114, which is detected by the battery protection circuit 204. In some implementations, a differential operational amplifier in the battery protection circuit 204 amplifies the voltage with a suitable gain. The output from the differential operational amplifier is compared to a reference signal (e.g., produced by an accurate, programmable on-chip voltage reference) using an analog comparator. If a programmable number of samples $N_1$ (e.g., $N_1=1$) of the measured current is above a specified limit, an early warning interrupt flag is set in the processor 202. This gives the processor 202 an indication that a potential hazardous situation is in progress and the processor 202 can take appropriate actions.

Discharge Over-Current Warning and Protection

If a programmable number of samples $N_2$ of the discharge current is above a pre-determined discharge over-current limit for a time longer than a predetermined over-current protection reaction time, the battery management system 130 activates discharge over-current protection measures. In some implementations, when the discharge over-current protection measures are activated, the external discharge transistor 112 is disabled to stop current flow. In some implementations, the user can connect a charger to the battery pack 100 to re-enable the discharge transistor 112. In other implementations, a current protection timer is started in, for example, the battery protection circuit 204. The current protection timer ensures that the discharge transistor 112 is disabled for a minimum period of time (e.g., at least 1 second) before allowing re-enabling the discharge transistor 112. Application software in memory 218 (e.g., EEPROM, RAM, Flash ROM, etc.) executed by the processor 202 can be used to re-enable normal operation after the current protection timer has timed out. For example, the application software can enable control bits in control and status registers in the current flow controller 206, which causes the voltages at outputs OC and OD to change. In some implementations, if the discharge transistor 112 is re-enabled while the loading of the battery is still too large, the discharge over-current protection measures can be activated again. In some implementations, the sense resistor 114 is checked for discharge over-current by the battery protection circuit 204. If discharge over-current is detected, the discharge transistor 112 is enabled only if a charger is detected.

Charge Over-Current Warning and Protection

If a programmable number of samples $N_3$ of the charge current is above a predetermined charge over-current detection level for a time longer than a predetermined over-current reaction time, the battery management system 130 activates charge over-current protection measures. In some implementations, when the charge over-current protection measures are activated, the external charge transistor 110 is disabled and a current protection timer is started in, for example, the battery protection circuit 204. The timer ensures that the transistor 110 is disabled for a predetermined period of time (e.g., at least 1 second). The application software in memory 218 executed by the processor 202 can provide the proper control bits in the control and status registers of the current flow controller 206 to re-enable normal operation. If the charge transistor 110 is re-enabled and the charger continues to supply too high currents, the charge over-current protection can be activated again.

Short Circuit Warning and Protection

In some implementations, a second level of high current detection is provided to enable a fast response time to large discharge currents, such as those occurring in a short circuit event. The response time is determined by a short circuit sampling interval that is less than M microseconds (e.g., 100 microseconds). If a programmable number of samples $N_4$ (e.g., $N_4=1$) of the discharge current is above a predetermined short circuit detection limit for a period of time longer than a predetermined short circuit reaction time, the battery management system 130 activates short circuit protection measures. In some implementations, when short circuit protection is activated, the discharge transistor 112 can be disabled in the same manner as for discharge over-current protection.

Some applications require a reaction time of typically 100-500 microseconds. However, some applications require longer reaction times, typically 5 milliseconds, to allow for more stable operating conditions for the device 102 connected to the battery pack 100 in the case that the device 102 draws a large current from the battery pack 100.

In some implementations, the activation of battery protection measures can cause an interrupt to be issued to the processor 202 by the battery protection circuit 204. For example, the battery protection circuit 204 can issue battery protection interrupts to the processor 202 over data bus 224. The battery protection interrupts can be disabled by the processor 202, so that the processor 202 does not respond to the battery protection interrupts. When the processor 202 receives the battery protection interrupts it can perform various actions, such as changing to a low power consumption mode or issuing control commands to the current flow controller 206 to control current flow through transistors 110, 112.

Once a potential short circuit violation is detected, the short circuit early warning interrupt flag is set. An interrupt can be received by the processor 202 if the short circuit interrupt is enabled. After receiving the interrupt, the processor 202 can minimize power consumption during the time until the short circuit protection measures are executed or until the source generating the hazard is removed. An efficient way of minimizing power can be to enter the processor 202 into a sleep mode until a safe operating condition can be established. The processor 202 can wake up from sleep mode when the current has returned to a safe level. An external energy storage device can be coupled to the battery management system 130 (e.g., energy storage device 308 in FIG. 3) and properly dimensioned to supply the battery management system 130 with power during the short circuit protection period.

The implementations described above for monitoring, detecting and responding to battery protection events are exemplary, and other implementations are possible. For example, other battery protection schemes are possible, such as over-charge or over-discharge protection implemented by dedicated hardware and/or software executed by the processor 202.

Power Supervisor

The power supervisor 210 helps reduce system power consumption by managing various low-power modes for the battery management system 130, which are also referred to as "sleep modes." In some implementations, the power supervisor 210 manages four sleep modes allowing the user to tailor the power consumption of the battery management system 130 as desired. In an Idle mode, the processor 202 is stopped but all peripheral functions continue operating. In a Power-save mode, fast oscillators are stopped and only battery protection circuit 204 and slow oscillators are kept running, as well as current measuring circuitry (e.g., analog-to-digital converters, etc.) and an asynchronous timer for maintaining a real-time clock. In a Power-down mode, the clock generator 214 is halted. The battery protection circuit 204, the watchdog timer 222, or an external interrupt, can wake up the battery management system 130. In a Power-off mode, the processor 202 instructs the voltage regulator 208 to shut off power to the processor 202, leaving only the voltage regulator 208 and the charger detect circuitry 212 to be operational. The Power-off mode minimizes power consumption to ensure that the battery cells are not damaged if they are stored for a long time without charging.

In some implementations, when a charger is detected, the battery pack 100 wakes up from the Power-off sleep mode and performs a power-on reset to start normal operation.

The power supervisor 210 is coupled to a supply voltage ($V_{CC}$). In some implementations, the supply voltage is a regulated voltage ($V_{Reg}$) provided by the voltage regulator 208. The power supervisor 210 can also have a RESET input. For example, if there is a low level on this input for longer than a predetermined minimum pulse length, then the battery management system 130 will reset, even if the clock generator 214 is not running.

The power supervisor 210 is also coupled to the watchdog timer 222, the charge detector 212 and the voltage regulator 208. The watchdog timer 222 provides a wake-up signal to the power supervisor 210 when it is operating in a Power-down mode. The charger detector 212 is coupled to an input (BATT) for detecting when a charger is connected and notifying the power supervisor 210 of such event, so that it can enter into a suitable mode for charging. The voltage regulator 208 provides the power supervisor 210 with the regulated voltage $V_{Reg}$.

Combination Linear/Step-Up Voltage Regulator

Figure 3:
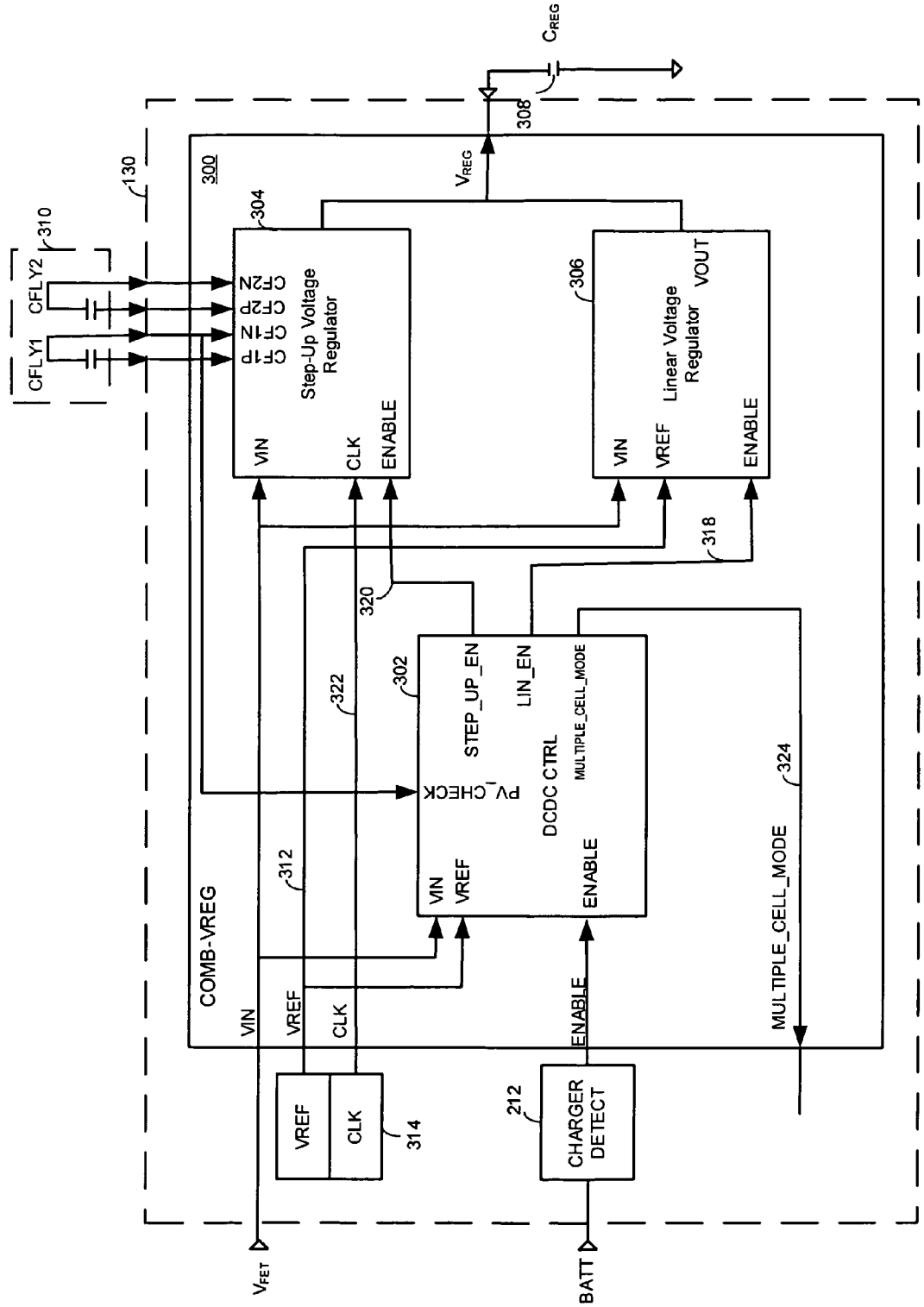
FIG. 3 is a block diagram of an exemplary combination linear and step-up voltage regulator used in the battery chip shown in FIG. 2.

FIG. 3 is a block diagram of an exemplary combination linear/step-up voltage regulator 300 used in the battery management system 130 shown in FIG. 2. The voltage regulator 300 receives an input voltage $V_{fet}$ and provides a regulated output voltage $V_{REG}$ for use by the battery management system 130 and external circuitry coupled to the battery management system 130. $V_{fet}$ is the power input to the battery management system 130 and is provided by either the battery cells 120 or an external charger 104 through the transistors 110, 112. Since modern semiconductors typically run on a power supply in the range of approximately 2 to 5 volts, a battery cell supplying, for example, up to about 8.4 volts cannot supply the battery management system 130 directly. The voltage regulator 300 can regulate the battery cell voltage down to a level suitable for on-chip logic, low voltage I/O lines and analog circuitry (e.g., about 3.3 volts).

The voltage regulator 300 includes a step-up voltage regulator 304 and a linear voltage regulator 306. In some implementations, only one of the step-up voltage regulator 304 and the linear voltage regulator 306 can be enabled at a time. A controller 302 provides enable signals on lines 318, 320, to the voltage regulators 306 and 304, respectively. The enable signals 318, 320, determine which of the voltage regulators 306, 304, will be enabled or disabled, as described with respect to FIG. 6.

In some implementations, when a short circuit occurs the voltage regulator 300 detects that the input voltage ($V_{fet}$) has dropped below a certain threshold level, as described with respect to FIG. 6. If the voltage level drops too far, the voltage regulator 300 will stop providing a regulated voltage. The output of the voltage regulator 300 is coupled to an energy storage device 308 (e.g., a large reservoir capacitor), which is used to remove voltage ripple and to supply large current spikes during normal operation. During short circuit events, however, the remaining charge in the energy storage device 308 can be used to supply power to the battery management system 130 in place of the voltage regulator 300 (e.g., when the voltage regulator 300 is no longer providing regulated voltage). The energy storage device 308 can be dimensioned (e.g., 1-10 μF) to meet the current supply requirements for the battery system in the period in which the energy storage device 308 supplies the battery management system 130 (e.g., during a short circuit event). If the energy storage device 308 cannot supply the required current for any reason, then the battery management system 130 can be configured to reset itself to ensure safe operational constraints are satisfied.

Linear Voltage Regulator

Figure 4:
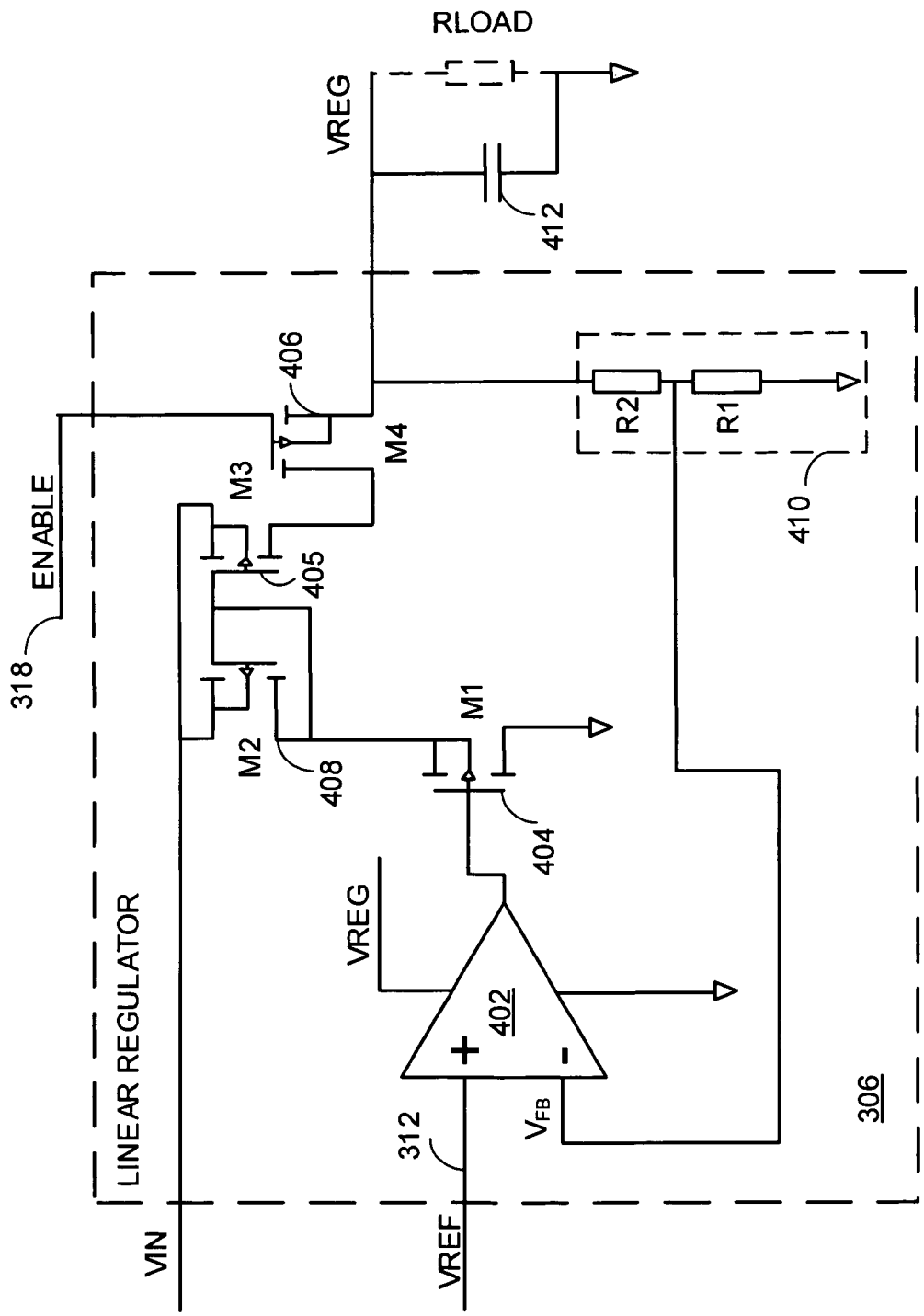
FIG. 4 is a block diagram of an exemplary linear voltage regulator used in the combination voltage regulator shown in FIG. 3.

FIG. 4 is a block diagram of an exemplary linear voltage regulator 306 used in the combination voltage regulator 300 shown in FIG. 3. In some implementations, the linear voltage regulator 306 includes an error amplifier 402, switches 404 (M1), 405 (M3), 406(M4) and 408 (M2), a resistive network 410 and a reservoir capacitor 412. The non-inverting input of the error amplifier 402 receives a stable voltage reference on line 312 (e.g., voltage reference 220). The error amplifier 402 (e.g., a differential amplifier) compares the stable voltage reference with a feedback voltage, $V_{fb}$, provided by a resistive network 410, and outputs an error voltage. In some implementations, the resistive network 410 is a voltage divider including resistors R1 and R2, which takes a percentage of the voltage at the output of switch 406 (M4) and feeds it into the inverting input of the error amplifier 402.

The output of the error amplifier 402 is input into the switch 404 (M1) (e.g., a PFET), which is coupled to a current-mirror configuration composed of switches 405 (M3) and 408 (M2). The current through switch 408 (M2) of the current-mirror configuration is mirrored in the switch 405 (M3). The input of switch 406 (M4) is coupled to the output switch 405 (M3). An enable signal 318 is provided by, for example, mode selection logic (FIG. 6) to enable/disable the output of the linear regulator 306 (e.g., enable/disable switch 406 (M4)). The output of switch 406 (M4) is coupled to the reservoir capacitor 412 and a load (RLOAD).

With the configuration shown in FIG. 4, the voltage regulator 300 can detect a short circuit by detecting that supply voltage $V_{in}$ ($V_{fet}$) has dropped below a predetermined threshold voltage level, as described with respect to FIG. 6. The threshold voltage level can be different for single cell and multiple cell operation. When a short circuit is detected, the external transistors 110, 112, may be disabled so as to disconnect the voltage regulator 300 from the input voltage $V_{in}$ ($V_{fet}$). In some implementations, the external transistors 110, 112, can be disabled after a time delay (e.g., a short or long delay). The time delay can be programmed based on the device 102 (e.g., different for a camera versus a camcorder). In a short circuit condition, the battery cells 120 can be pulled to a low potential, and as such the short circuit condition will seek power from all available power sources, including the energy storage device 308 shown in FIG. 3. Ideally, the switch 405 (M3) would prevent the energy storage device 308 from draining through the low potential $V_{in}$ ($V_{fet}$) input. If the switch 405 (M3) is implemented with a conventional PFET, however, then current can drain from the energy storage device 308 through a parasitic diode that is inherent in PFET devices. To prevent this current leakage, the switch 406 (M4) can be implemented with another PFET device and coupled in reverse with the switch 405 (M3), such that the parasitic diode inherent in the switch 406 (M4) and the parasitic diode inherent in the switch 405 (M3) are conducting in opposite directions. For example, the switches 405 (M3) and 406 (M4) can be connected source-to-source with their respective parasitic diodes pointing away from each other. In some implementations, the switch 406 (M4) can be disabled during short circuit conditions by signal line 318 provided by the controller 302 shown in FIG. 3.

In other implementations, the switch 405 (M3) can be fabricated using different process technology to reduce the undesirable current-draining characteristic of a parasitic diode. Alternatively, the bulk of switch 405 (M3) can be switched so as to not require switch 406 (M4) to ensure disabling the linear regulator 306.

Step-Up Voltage Regulator

Figure 5:
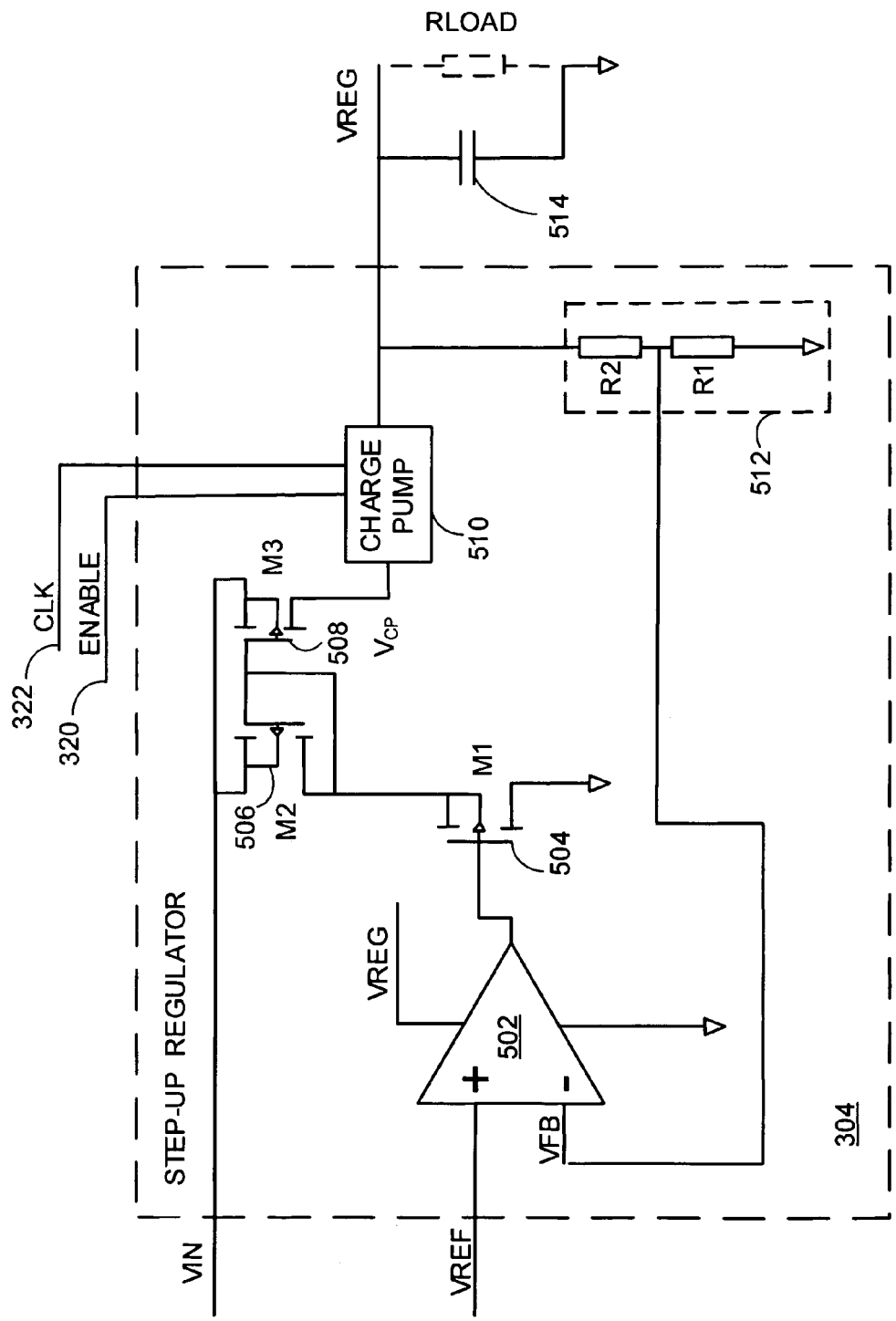
FIG. 5 is a block diagram of an exemplary step-up voltage regulator used in the combination voltage regulator shown in FIG. 3.

FIG. 5 is a block diagram of an exemplary step-up voltage regulator circuit 304 used in the combination voltage regulator 300 shown in FIG. 3. The step-up voltage regulator 304 includes an error amplifier 502, switches 504 (M1), 506 (M2) and 508 (M3), charge pump 510, resistive network 512 and a reservoir capacitor 514. The step-up voltage regulator 304 differs from the linear voltage regulator 306 in that it can provide voltage output that is higher than the voltage input. This step-up voltage capability is provided by the charge pump 510 and "fly" capacitors 310 (e.g., 220 nF) coupled to the step-up voltage regulator 304, as shown in FIG. 3.

The non-inverting input of the error amplifier 502 (e.g. a differential amplifier) is coupled to a stable reference voltage (e.g., the voltage reference 220 shown in FIG. 2). The inverting input of the error amplifier 502 is coupled to the resistive network 512, which provides a percentage of the output of the charge pump 510. In some implementations, the resistive network 512 is a voltage divider composed of resistors R1 and R2. The output of the charge pump 510 ($V_{Reg}$) is coupled to the reservoir capacitor 514 for smoothing out the output voltage. The error amplifier 502 provides an error voltage based on a comparison of its non-inverting and inverting inputs. The error voltage is provided to the input of switch 504 (M1), which is coupled to a current-mirror configuration composed of switches 506 (M2) and 508 (M3). The current-mirror configuration provides an input voltage $V_{cp}$ to the charge pump 510, which is stepped-up to the desired voltage level and input to the reservoir capacitor 514 to provide the regulated voltage $V_{Reg}$.

In contrast to the linear voltage regulator 306, the parasitic diode effect in switch 508 (M3) can be address by simply stopping the clock signal on line 322. When the charge pump 510 is stopped, current cannot be drained from the energy storage device (e.g., reservoir capacitor 514) through the charge pump 510 when the input voltage Vin ($V_{REF}$) goes low during a battery protection event.

Mode Selection Logic

Figure 6:
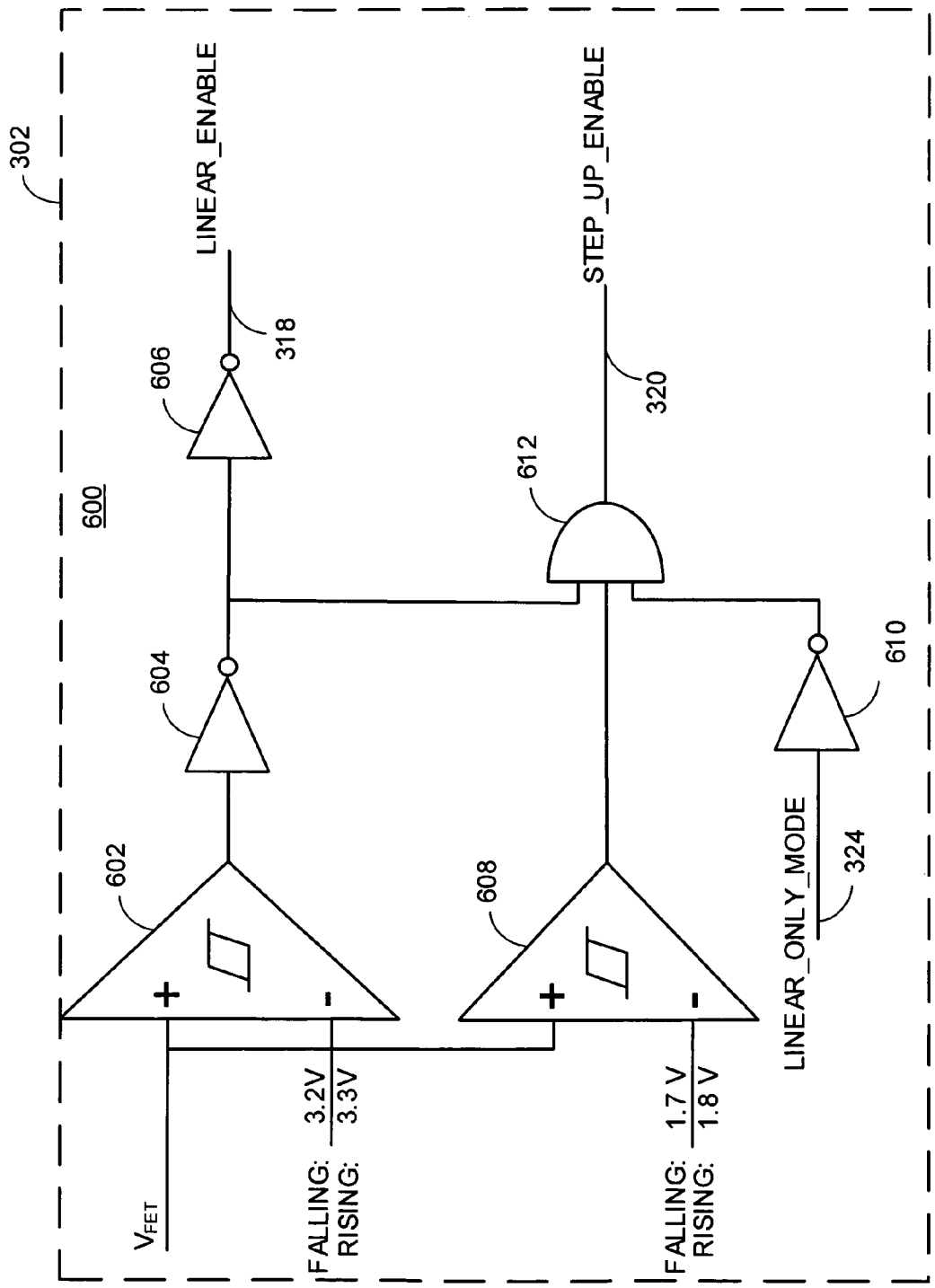
FIG. 6 is a block diagram of exemplary mode selection logic used in the voltage regulator shown in FIG. 3.

FIG. 6 is a block diagram of exemplary mode selection logic 600 used in the controller 302 of the voltage regulator 300 shown in FIG. 3. In some implementations, the voltage regulator 300 can operate in four modes: in a linear regulator mode, in a combination mode (i.e., both linear and step-up), in a step-up regulator mode and in a short circuit protection mode. In some implementations of a multiple-cell battery application, the linear voltage regulator mode is selected (i.e., only linear voltage regulator 306 is used to provide $V_{Reg}$). In some implementations of a single-cell battery application, the combination mode is selected (i.e., both the linear voltage regulator 306 and the step-up voltage regulator 304 may regulate voltage one at a time). Other regulator modes are possible.

Multiple Cell Battery Applications

In one multiple-cell battery application, if $V_{fet}$ is above the short circuit detection level for comparator 602 (e.g., about 3.2-3.3 volts (falling/rising)), then the linear voltage regulator 306 is enabled and the battery management system 130 is operating in linear mode. More particularly, the output of comparator 602 is high, the output of inverter 604 is low and the output of inverter 606 is high, thereby enabling linear voltage regulator 306. The output of inverter 606 is the linear_enable signal applied to line 318 shown in FIG. 3. If this signal is high, the linear voltage regulator 400 is enabled.

If $V_{fet}$ falls below the short circuit detection level of the comparator 602, then a short circuit protection event has occurred. During the short circuit protection event, the linear voltage regulator 306 is disconnected from $V_{fet}$ and the energy storage device 308 coupled to the output of voltage regulator 300 provides power to the battery management system 130, as described with respect to FIG. 3. More particularly, the output of comparator 602 goes low, the output of inverter 604 goes high and the output of inverter 606 goes low, disabling the linear voltage regulator 306.

Note that for this multiple-cell application, the Linear_Only_Mode signal 324 prevents the enabling of the step-up voltage regulator 304 during the short circuit protection mode. More particularly, in this multiple-cell application where only the linear mode is used, then the Linear_Only_Mode signal 324 is high and the output of inverter 610 is low, forcing the output of AND gate 612 low and disabling the step-up voltage regulator 304. Note that the output of AND gate 612 is the set_up_enable signal 320 shown in FIG. 3.

Single Cell Battery Applications

In one single-cell battery application, if $V_{fet}$ is above the short circuit detection level for the comparator 602, then the linear voltage regulator 306 is enabled as previously described. If $V_{fet}$ falls below the short circuit detection level for the comparator 602, but stays above the short circuit detection level for comparator 608 (e.g., about 1.7-1.8 volts (falling/rising)), then the linear voltage regulator 306 is disabled and the step-up voltage regulator 304 is enabled. More particularly, the output of comparator 608 is high, the output of inverter 604 is high and the output of inverter 610 is high. Since all three inputs to the AND gate 612 are high, the step_up_enable signal on line 320 is high, resulting in the step-up voltage regulator 304 being enabled, as shown in FIG. 3. Note that the linear voltage regulator 306 is disabled because the output of inverter 606 is low (i.e., the linear_enable signal 318 is low).

If $V_{fet}$ continues to fall below the short circuit detection level for this single-cell battery application, then the linear voltage regulator 306 remains disabled and the step-up voltage regulator 304 is also disabled. The disabling of both the linear voltage regulator 306 and the step-up voltage regulator 304 effectively stops the voltage regulator 300 from supplying regulated voltage to the chip 202. When the voltage regulator 300 is no longer supplying regulated voltage to the battery management system 130, then the energy storage device 308 coupled to the output of the voltage regulator 300 can supply power to the battery management system 130.

Battery Protection Process

Figure 7:
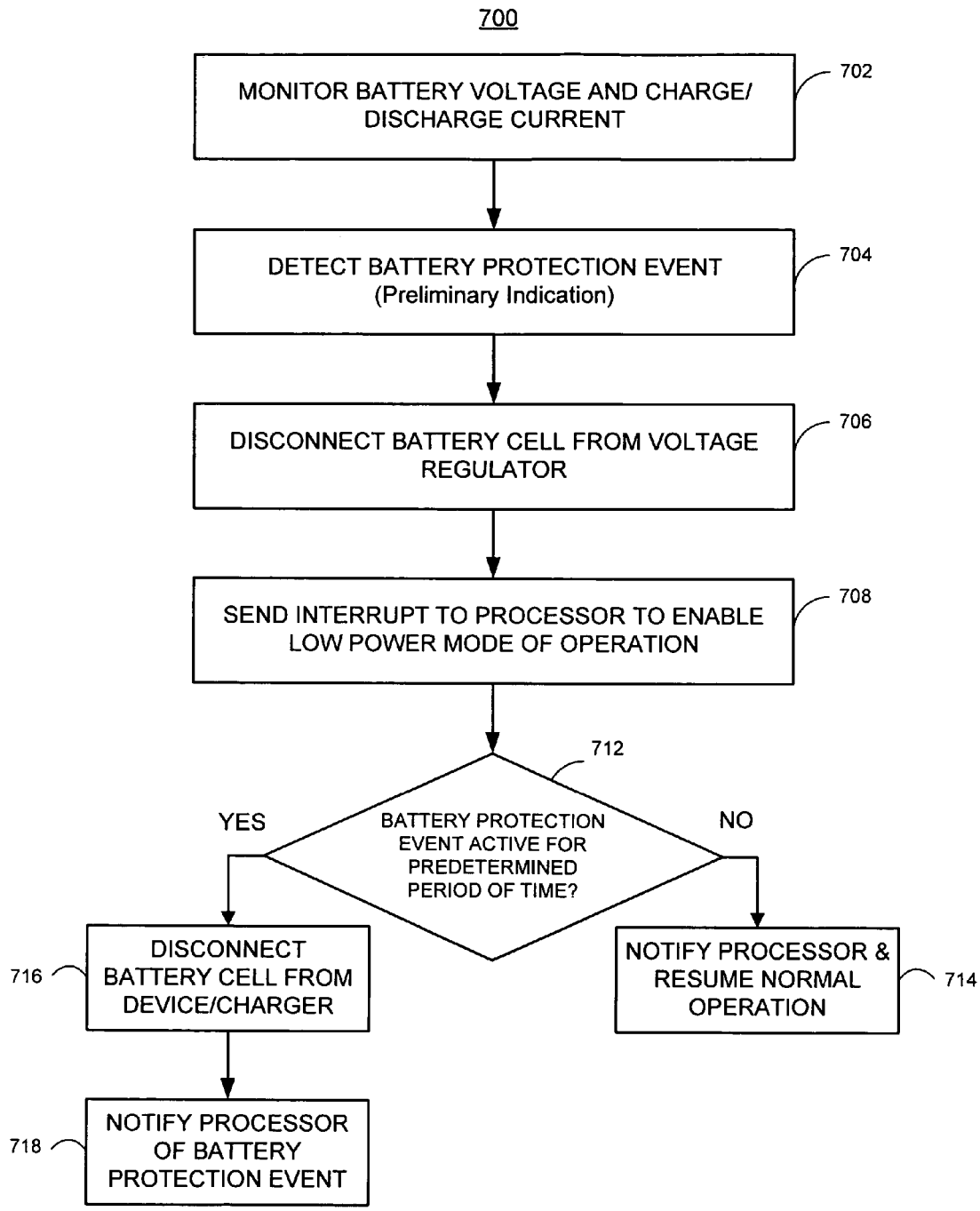
FIG. 7 is a flow diagram of an exemplary battery protection process.

FIG. 7 is a flow diagram of an exemplary battery protection process 700. The steps of process 700 do not have to occur in any specific order, and at least some of the steps can occur simultaneously.

The process 700 begins by monitoring battery voltage and charge/discharge currents for battery protection events (702). This can be achieved using the battery protection circuit 204 and current sense resistor R, as described with respect to FIG. 2. The process 700 detects a battery protection event (704) and in response causes the battery cell(s) to be disconnected from the voltage regulator (706). Examples of battery protection events include but are not limited to: deep under-voltage during discharging, short circuit during discharging and over-current during charging and discharging. Note that the battery detection step (704) provides a preliminary indication of a battery protection event.

During a short circuit condition, each battery cell in a multiple battery cell application can drop to as low as 1 volt. If the battery system has to support single-cell applications, then such voltages are too low. For these protection events, the voltage regulator can disconnect itself from the battery cell to prevent the energy storage device from draining voltage through the input voltage line, as described with respect to FIGS. 4-6. In some implementations, when battery protection is activated, the battery protection circuit can send a battery protection interrupt to the processor (e.g., processor 202) to enable a low power mode of operation (708). If the battery protection event is still active after a predetermined period of time (712) (e.g., 5 ms), then the battery cell(s) will be disconnected from the device or charger and the processor will be notified of the battery protection event (718). If the battery protection event is no longer active or removed before the predetermined period of time (712) has passed, then the processor will be notified and normal operation will resume (71).

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. An apparatus, comprising:
  a battery pack operable to be coupled to a device, where the battery pack includes:
    a battery cell;
    a battery protection circuit coupled to the battery cell;
    a processor coupled to the battery protection circuit for determining if a battery protection event has occurred;
    a voltage regulator circuit coupled to the battery cell and the processor, the voltage regulator circuit configurable to provide power to the processor, the voltage regulator circuit including a voltage regulator controller circuit coupled to a step-up voltage regulator and a linear voltage regulator, the voltage regulator controller circuit operable to enable and disable the step-up voltage regulator and the linear voltage regulator, the voltage regulator controller circuit operable to place the voltage regulator circuit into one of a linear regulator mode, a step-up regulator mode, a combination mode, and a protection mode;
    an energy storage device coupled to the voltage regulator circuit, and configurable to provide the processor with power during the battery protection event; and
    a switch coupled between the energy storage device and the battery cell, the switch configurable to selectively disconnect the energy storage device from the battery cell during the battery protection event, where the switch is included in the voltage regulator circuit.

2. The system of claim 1, where the battery protection event is one of a plurality of battery protection events including short circuit during discharging and over-current during charging and discharging.

3. The system of claim 1, where the energy storage device is a capacitor.

4. The system of claim 1, where the switch is included in the voltage regulator.

5. The system of claim 1, where the switch is a field effect transistor (FET) device.

6. An integrated circuit for a battery system, comprising:
a battery protection circuit adapted to be coupled to a battery cell;
a processor coupled to the battery protection circuit for determining if a battery protection event has occurred;
a voltage regulator circuit coupled to the processor and configurable to provide power to the processor, the voltage regulator circuit including a voltage regulator controller circuit coupled to a step-up voltage regulator and a linear voltage regulator, the voltage regulator controller circuit operable to enable and disable the step-up voltage regulator and the linear voltage regulator, the voltage regulator controller circuit operable to place the voltage regulator circuit into one of a linear regulator mode, a step-up regulator mode, a combination mode, and a protection mode;
an energy storage device coupled to the voltage regulator circuit, and configurable to provide the processor with power during the battery protection event; and a switch coupled between the energy storage device and the battery cell, the switch configurable to disconnect the energy storage device from the battery cell during the battery protection event, where the switch is included in the voltage regulator circuit.

7. The system of claim 6, where the battery protection event is one of a plurality of battery protection events including short circuit during discharging, over-current during charging and discharging and a sudden drop in battery cell voltage.

8. The system of claim 6, where the energy storage device is a capacitor.

9. A battery protection method, comprising:
providing power from a voltage regulator to a processor in a battery system, wherein the voltage regulator is coupled to a battery cell and regulates the voltage received from the battery cell to provide the power to the battery system, the voltage regulator including a voltage regulator controller circuit coupled to a step-up voltage regulator and a linear voltage regulator, the voltage regulator controller circuit operable to enable and disable the step-up voltage regulator and the linear voltage regulator, the voltage regulator controller circuit operable to place the voltage regulator into one of a linear regulator mode, a step-up regulator mode, a combination mode, and a protection mode;
receiving signals indicative of a battery protection event;
during the battery protection event:
selectably disconnecting the voltage regulator from the battery cell; and
providing power to the processor from an energy storage device coupled to the battery cell.

10. The method of claim 9, further comprising:
during the battery protection event, disconnecting the energy storage device from the battery cell.

11. The method of claim 9, further comprising:
issuing an interrupt to the processor; and
changing a power mode of the processor in response to the interrupt.

12. The method of claim 11, where changing the power mode includes changing to a low power consumption mode.

13. The method of claim 11, where changing the power mode includes changing the power mode to a power mode from a plurality of power modes including Idle, Power-save, Power-down and Power-off 14. An integrated circuit for a battery system, comprising:
a battery protection circuit adapted to be coupled to a battery cell;
a processor coupled to the battery protection circuit and configurable to receive signals from the battery protection circuit for determining if a battery protection event has occurred;
a voltage regulator circuit coupled to the processor and configurable to provide power to the processor during times other than battery protection events, the voltage regulator circuit including a voltage regulator controller circuit coupled to a step-up voltage regulator and a linear voltage regulator, the voltage regulator controller circuit operable to enable and disable the step-up voltage regulator and the linear voltage regulator, the voltage regulator controller circuit operable to place the voltage regulator circuit into one of a linear regulator mode, a step-up regulator mode, a combination mode, and a protection mode; and
an energy storage device coupled to the voltage regulator, and configurable to provide the processor with power during the battery protection event.

15. The integrated circuit of claim 14, where the battery protection circuit issues an interrupt signal to the processor upon detection of a battery protection event and the processor changes to a low power consumption mode in response to the interrupt signal.

16. The integrated circuit of claim 14, further comprising:
a switch coupled between the energy storage device and the battery cell, the switch configurable to disconnect the energy storage device from the battery cell during the battery protection event.

17. The integrated circuit of claim 14, wherein the battery protection event is one of a plurality of battery protection events including short circuit during discharging and over-current during charging and discharging.

18. A battery protection method, comprising:
receiving signals indicative of a battery protection event;
providing an interrupt signal to a processor;
changing the processor to a low power consumption mode in response to the interrupt signal; and
providing power from a voltage regulator to the processor, where the voltage regulator is coupled to a battery cell and regulates the voltage received from the battery cell to provide the power to the battery management system, the voltage regulator including a switch configurable for switching an energy storage device to the processor during the battery protection event, the voltage regulator including a voltage regulator controller circuit coupled to a step-up voltage regulator and a linear voltage regulator, the voltage regulator controller circuit operable to enable and disable the step-up voltage regulator and the linear voltage regulator, the voltage regulator controller circuit operable to place the voltage regulator into one of a linear regulator mode, a step-up regulator mode, a combination mode, and a protection mode.

* * * * *